United States Patent [19]

Davis et al.

[11] 3,855,592

[45] Dec. 17, 1974

[54] TRANSPONDER HAVING HIGH CHARACTER CAPACITY

[75] Inventors: Richard K. Davis, Roanoke; Ronald E. Gareis, Salem, both of Va.

[73] Assignee: General Electric Company, Salem, Va.

[22] Filed: Aug. 20, 1973

[21] Appl. No.: 390,122

[52] U.S. Cl.......................... 343/6.8 LC, 343/6.5 LC
[51] Int. Cl................................................ G01s 9/56
[58] Field of Search ...... 343/6.8 LC, 6.5 LC, 6.8 R, 343/6.5 R, 6.5 SS

[56] References Cited
UNITED STATES PATENTS

| | | | |
|---|---|---|---|
| 3,270,338 | 8/1966 | Watters............................ | 343/6.5 R |
| 3,336,591 | 8/1967 | Michnik et al. ................ | 343/6.8 LC |
| 3,512,154 | 5/1970 | Farrar............................. | 343/6.8 LC |
| 3,541,257 | 11/1970 | McCormick et al........... | 343/6.8 LC |
| 3,564,545 | 2/1971 | Gottlieb et al................. | 343/6.5 LC |
| 3,579,235 | 5/1971 | Straub et al. .................. | 343/6.5 LC |
| 3,745,569 | 7/1973 | Works et al. ................... | 343/6.5 SS |

Primary Examiner—Maynard R. Wilbur
Assistant Examiner—G. E. Montone
Attorney, Agent, or Firm—James H. Beusse; Harold H. Green, Jr.

[57] ABSTRACT

A passive transponder having the capability of producing a large number of unique identification signals. The transponder is provided with an antenna for receiving a relatively low-frequency signal which provides energy for activating the transponder. Oscillations in the received signal are utilized to time the sequential energization of a plurality of output terminals of an encoding device. Preselected ones of the output terminals are connected to signal utilization stages. A second encoding device sequentially energizes the signal utilization stages which are in turn coupled to a transmitter and serve to modulate the transmitted signal in a manner reflecting the pattern in which the output terminals are connected. A unique output signal is thereby produced for identifying the individual transponder.

11 Claims, 1 Drawing Figure

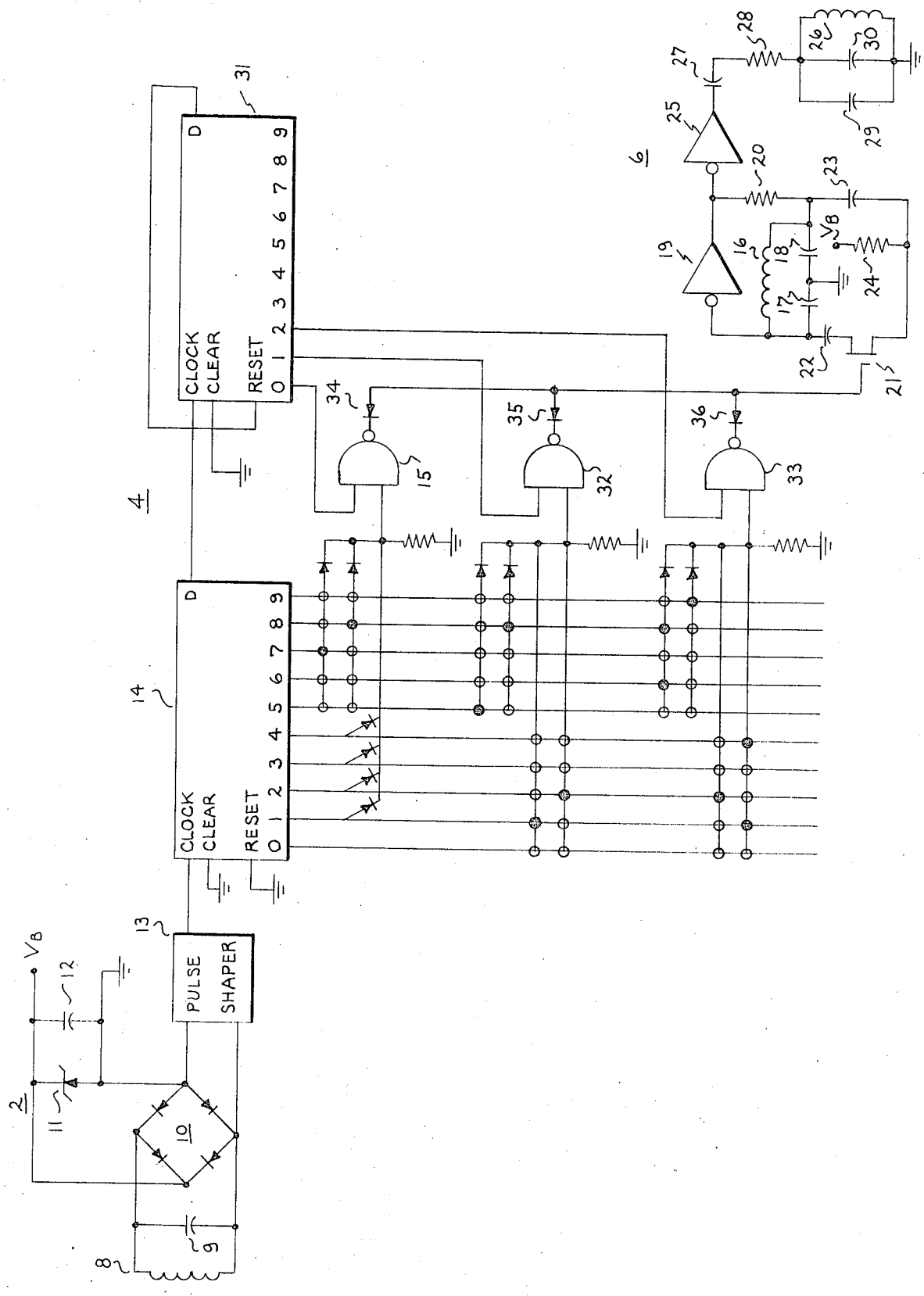

3,855,592

TRANSPONDER HAVING HIGH CHARACTER CAPACITY

BACKGROUND OF THE INVENTION

The present invention relates to radio wave communication systems for identifying vehicles and, more particularly, to an improved transponder of the passive type.

It has long been recognized that it would be highly desirable to automatically identify vehicles, without the need for monotonous and error-prone manual monitoring. The counting and identification of railroad cars to verify their location and to effect automatic switching for shunting various cars to the proper sidings or to make up predesignated trains, is an obviously useful application. Further, it has long been desired to provide automated toll booths on highways which would eliminate the need for the receipt and disbursement of cash, and would facilitate the nonstop processing of high-speed traffic. Further, the automatic identification of vehicles has other advantages which are not so apparent; e.g. the identification of predetermined vehicles which have been stolen, suspected of having faulty equipment, and the like; or for the compilation of records necessary for the periodic maintenance of trucks and buses.

Several formidable obstacles have prevented the implementation of such systems. The cost and need for standardization of systems presents a difficult problem, as does the choice of a specific approach which is adaptable to disparate uses and will thus afford commonality to systems in various locations. The systems should be practically immune to failure, relatively insensitive to unfavorable temperature and climatic conditions, be able to withstand physical abuse and should be producible on a mass basis at a relatively low cost.

These criteria can be met more easily by fixed installations than by those portions of the system which must be affixed to a vehicle. For one thing, a large amount of money can be spent upon relatively permanent, fixed installations to render them substantially immune to failure, yet remaining highly sensitive such that they accurately receive and record data from vehicles. The same is unfortunately not true for units which are placed on vehicles. For one thing, the cost of the mobile installation must necessarily be far smaller than that of a fixed, permanent installation. Further, devices which are affixed to vehicles undergo vibration, shock and other physical abuse which is not anticipated for fixed installations. Still further, and especially in the case for automotive applications, it is expected that little if any maintenance should be required for the units. In addition, it is desirable that the mobile units be passive, i.e. not coupled to on-board power supplies since this provides yet another area of possible failure through improper connection or damage.

One system which largely overcomes the foregoing problems is disclosed in U.S. Pat. No. 3,270,338-Watters. This patent teaches an identification system wherein the mobile identification unit comprises passive, unpowered circuitry adapted to produce a unique signal upon interrogation. The fixed or "interrogator" unit produces a relatively low-frequency signal which is picked up by an antenna in the transponder and used to energize the transponder circuitry. Once energized, the transponder outputs a coded, high-frequency signal which is received by the fixed interrogator system and which serves to uniquely identify the transponder, and thus the vehicle to which it is attached. The system suggested by Watters, while serviceable, is severely limited in the number of combinations of identifying signals which it can produce. Watters anticipates the use of a simulated transmission line having serially-connected T networks of inductances and capacitances which transfer a signal therethrough at a predetermined rate, producing pulses at each juncture. Pickup coils associated with each T-junction are selectively coupled to the transmitting stage such that pulses are received by the transmitter in a sequence or pattern unique to each transponder.

While the foregoing system is satisfactory for some purposes, it is not fully adaptable to usage on a massive scale. Due to the relatively large amount of power needed to energize such a system, the transponder must be mounted on a vehicle so that it comes in relatively close proximity to a road-based sensor or else the interrogator must produce an interrogating signal of an inordinately large magnitude, or both. Safety considerations tend to make high-powered interrogators undesirable; in addition, there is the possibility of stray signals or "cross talk" from one interrogation system to another, although it is believed that proper directivity of an interrogator antenna along with properly-designed shielding, may mitigate this problem.

A more serious problem is the limited capacity of such a system. As set forth above, it is extremely desirable that vehicle identification systems have commonality such that a standard system of vehicle identification coding may be established. Absent this crucial feature, automatic vehicle identification systems would be worthless in areas encountering large numbers of vehicles adapted to other systems. In particular, most large highways are traveled by many vehicles from distant areas and it is therefore necessary to the successful operation of any automatic vehicle identification system that a common type of vehicle identification, and thus transponder, be established. This criterion in turn makes necessary transponders of similar design but which are adaptable to produce a very large number of unique codings or "words" in response to an interrogating signal. Moreover, the more information desired from the vehicle, the longer the "word" which must be transmitted. Since most practical types of interrogator-transponder systems utilize digitally-coded signals, this means that the number of digits or "bits" which must be produced by a transponder is multiplied many times, necessarily increasing capability of the transponder.

While it is possible to physically expand transponder circuitry to produce any number of signals, in fact power requirements and size limitations place strict constraints on the size thereof. In order to produce the required number of signal combinations, delay-line systems such as that shown by Watters must be caused to increase tremendously in size. Similarly, prior-art approaches to providing coded digital signals, such as the use of shift registers, would necessitate large transponders due to the need for serially coupling many shift registers together to achieve the capability for providing the necessary number of bits. Still further, by merely adding or compounding signal-producing units the power requirements of the system would be increased significantly, making it even more difficult to implement a practical passive-type transponder. It will therefore be seen that it would be highly desirable to provide a transponder of the passive type which requires only low power, is small in size, and which has the capability of producing a very large number of unique signals.

It is therefore an object of the present invention to provide an improved passive-type transponder for automatic vehicle identification systems.

It is a further object to provide a passive transponder which is adapted to produce a large number of unique output signals.

It is still another object to provide a passive transponder which can be operated with a very small amount of power.

SUMMARY OF THE INVENTION

Briefly stated, in accordance with one aspect of this invention the foregoing objects are achieved by providing a sensing means for developing power from a received signal, and a clocking means which operates to produce a fixed-frequency clock signal in response to the received signal. The clocking means is operatively coupled to an encoder having a plurality of energizable outputs. The clock causes the encoder to sequentially energize each of the outputs thereof at a fixed rate. A plurality of signal utilization stages are selectively coupled to ones of the output terminals. A second encoder operates to sequentially energize the signal utilization means each time that all of the output terminals of the first encoder means have been energized. The signal utilization means applies a modulating signal to a radio frequency transmitter for modulating the outputted radio frequency signal in a manner which reflects the selective connection of the signal utilization stages to the encoder output terminals.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which the single FIGURE represents an idealized schematic circuit, showing the features of the invention.

DESCRIPTION OF THE PREFERRED EMBODIMENT

The single FIGURE represents in schematic form a passive transponder which is adapted to produce and transmit a unique signal in response to the reception of an energizing or interrogating signal. A sensing means 2 is provided for generating a supply voltage and for outputting a periodic signal in response to the impingement upon the transponder of an electromagnetic signal. A signal-producing stage 4, powered by sensing means 2, is adapted to produce a unique modulating signal and applies it to transmitter stage 6. The modulated radio frequency signal produced by the transmitter 6 reflects the unique signals received from signal-producing stage 4 and may thus be utilized to identify the transponder.

Turning now to the specific circuitry disclosed in the FIGURE an antenna 8 and associated capacitor 9 are provided, and sized to resonate at the frequency of an activating or interrogating signal. When the transponder enters the field of such a signal a generally sinusoidal voltage arises across the antenna and applied to a bridge rectifier 10. The full-wave rectified voltage thus achieved is limited or clipped to a predetermined level by means of Zener diode 11, and filtered by means of capacitor 12 for eliminating most of the ripple thereof. The resulting voltage, herein denominated $V_b$, is used to power the other circuitry of the transponder so that the transponder need not be associated with any external power source. For this reason, the transponder is characterized as "passive."

Coupled across one of the diodes of rectifying bridge 10 is shaping circuit 13. The shaping circuit is intended to convert ill-defined oscillatory waveforms received from antenna 8 into a train of pulses suitable for performing a clocking or timing function.

In one experimental system the shaping circuit comprised a logical element of the type commonly denominated a NOR gate. As will be recognized by those skilled in the art a NOR gate may be constituted by a conventional OR gate having an inverter coupled thereto. Such a device produces a signal having a first, predetermined value when signals of a second, predetermined value are present at either of the inputs thereof. By denominating one signal level a digital "1" and the other level a digital "0" the operation of the NOR gate may be described as producing a 0 output when digital 1's are present at either of the inputs thereof, and a 1 output otherwise. The shaping circuit shown is operated by alternate half-cycles of the signal appearing across antenna 8, producing digital pulses at the same frequency as the received signal. While this arrangement is convenient due to its simplicity, it will be recognized that dividing or multiplying stages may also be provided to produce a clocking signal at another frequency.

The digital clocking signal produced by NOR gate 13 is applied to the "clock" input of an encoder means 14. The operation of such encoder means is straightforward, and familiar to those skilled in the art. As clock signals are received at the "clock" terminal thereof, successive ones of the output terminals of the encoder means are energized. Thus, upon the reception of a first pulse, the first output terminal is energized. When a second pulse is received, the first output terminal is de-energized, and the second output terminal becomes energized. This sequential energization continues in synchronism with the received clock pulses until all output terminals have been energized, at which point the encoder means recycles and begins again with the first output terminal.

One example of an encoding means which is adaptable for use with the present system is the CA-4017 CMOS (Complementary Metal Oxide Semiconductor) counter-encoder, manufactured by RCA — Solid State Division, Somerville, New Jersey. Such a device comprises integrated circuitry which includes field effect transistors of the metal oxide (MOS) variety, coupled in complementary fashion so that the required power is extremely low.

The signal utilization stage 15 is coupled to preselected ones of the output terminals of encoder means 14 by means of a series of diodes. The signal utilization stage, shown herein as a NAND gate, acts both as a buffering stage and a switch, as will be described hereinafter. The output of the signal utilization stage 15 is applied to transmitter 6 and operates to modulate the output thereof in accordance with signals received from encoder means 14.

Transmitter 6 is of the FM variety, and includes a parallel L-C circuit comprising an inductor 16 and capacitors 17, 18. An inverting amplifier 19 is coupled across the inductor by means of resistor 20 and provides a positive feedback thereto for effecting oscillations at a frequency determined by the reactive components of the circuit. A switching device, shown here as a field effect transistor (FET) 21, serves to couple additional capacitors 22, 23 across inductor 16. Power is supplied by way of resistance 24 from supply voltage $V_b$. As will be understood by one skilled in the art, when utilization stage 15 produces a signal which causes switch 21 to conduct capacitor 22 and 23 are coupled across the oscillatory stage, causing the natural frequency thereof to change. When no signal is outputted by utilization stage 15, switching means 21 is non-conductive and the natural frequency of oscillation of the circuit reverts to its prior value. The frequency of oscillation produced by the circuit is thus modulated as the function of the activity of signal utilization stage 15, and therefore of various predetermined ones of the pulses produced at the outputs of encoder means 14.

The second inverting amplifier 25 couples the oscillations across the aforementioned circuit to antenna 26 by way of coupling capacitor 27 and resistor 28. Tuning capacitors 29, 30 are connected across the antenna. Amplifier 25, in addition to amplifying the amplitude of the oscillations received, also acts as a buffer stage to prevent the presence of the antenna system from loading or otherwise detrimentally affecting the oscillatory characteristics of the frequency-producing stage.

The operation of the above-described system will now be discussed in detail, making reference to the enumerated elements. It is anticipated that all of the enumerated elements will be fitted into a single module and mounted in a suitable position so that the transponder will come within the range of an interrogation signal produced by a powered interrogator device. The entire system may be mounted upon a printed circuit board and encapsulated, or enclosed within a protective container. Antenna 8, which may be a series of conductive loops or a ferrite core, is advantageously mounted within the same package which contains the other circuit elements. When antenna 8 comes into proximate relationship with the output antenna of a powered interrogator unit the radio-frequency energy produced by the interrogator antenna is sensed by antenna 8, and a voltage appears thereacross. This alternating voltage is rectified by a means of bridge rectifier 10, and gives rise to biasing voltage $V_b$, as shown in the FIGURE. As the sensed signal varies, the oscillations trigger shaping circuit 13, causing it to change state rapidly and produce discrete clock pulses which occur at the same frequency as the received signal. In one experimental system, for instance, the frequency of the interrogation signal applied to antenna 8 was 10KHz. 10KHz clock pulses are thus applied to encoder means 14 which sequentially produces pulses at each of the various output terminals thereof. Where all of the output terminals are coupled to utilization stage 15, the result would be a 10KHz signal applied to, and outputted by, the signal utilization means. This would, however, be merely a meaningless pulse train which could be used to indicate the presence of the transponder, but would in no way uniquely identify it.

It is therefore necessary to somehow cause the system to produce a unique set of digital pulses, or a "word." This desideratum could be achieved by modifying the encoding means so as to produce a uniquely-spaced train of pulses; however, this approach would be inordinately expensive for mass production, and would have little advantage over the artificial transmission lines used in the prior art. Rather, the present invention contemplates the provision of a plurality of circuit means, extending from each of the output terminals to the signal utilization stage. In the illustrated embodiments, the circuit means comprise diodes, which afford an isolation or buffering function in addition to coupling output signals from the output terminal to the signal utilization means.

In the configuration illustrated, diodes are shown coupling output terminals 1 through 4 in common to the NAND gate 15. A plurality of separate conductors, each associated with an individual diode, crosses output terminals 5 – 9 to form a matrix. Each circle at the intersection of a conductor and a terminal indicates a potential point of connection. With this construction, output terminals 5 –to 9 may easily be programmed, or selectively coupled, to NAND gate 15 by means of ones of the diodes. Such coupling is represented by round dots or filled-in circles.

In the illustrated embodiment, it is anticipated that a special signal will be given to indicate the start of a message from any transponder. This is necessary to assure synchronization of the decoding and receiving units in the fixed interrogating system. In the illustrated example, an indication of the start of a word is given by a digital 0, followed by four digital 1's. The following five places, or bits, are then used to identify the transponder and are determined by connecting preselected output terminals of encoder 14 to NAND gate 15 through the diodes by simply connecting intersecting conductors at predetermined junctures. In the illustrated embodiment output terminals 7 and 8, corresponding to the eight and ninth bits of a 10-bit word, are coupled to ones of the diodes. NAND gate 15 thus receives, and generates for modulation of the transmitter stage, a digital word reading 0111100110. A digital signal of this character is then applied to the transmitting means and either amplitude — or frequency — modulates the resulting signal. In an experimental system it was found advantageous to shift the transmitted signal from 420 to 480KHz to indicate the presence of a digital 1.

It is apparent that the number of bits in a transmitted word will, with the system so far described, be limited to the number of output terminals of the encoding means used. As is contemplated in the prior art, additional encoding means could be added in series until the desired number of bits is achieved, but with the result that increased power would be required and further the size of the transponder would increase substantially. In order to obviate this problem, the present invention contemplates the use of a second encoder means 31. While encoder means 31 is shown to be identical to encoder means 14 it will be apparent to those skilled in the art that this need not be the case. However, by maintaining commonality of elements it is anticipated that the cost of the system will be somewhat reduced.

Encoder means 14 is provided with an output terminal D which outputs a signal after each cycle of sequential energization of output terminals 0–9. With an encoder having n output terminals, the frequency of the signals appearing at the output terminal D will thus be 1/n times the clock frequency; in the illustrated embodiment, 1KHz. This signal is applied to the "clock" input of encoder means 13 and drives encoder means 31 at a frequency one-tenth that of encoder means 14. The output terminals of encoder 31 are thus energized at one-tenth the rate of those of encoder 14. Therefore, for the first cycle of encoder 14, a first output 0 of encoder 31 is energized. For the second cycle of energization of encoder 14, the second output terminal of encoder 31 is energized, etc.

The output terminals of encoder 14 are coupled to ones of the signal utilization means. Although only two are shown, it will be recognized that one may be provided for each output terminal of encoder 31. Since the utilization means, illustrated as NAND gates, can only produce digital pulses upon the reception of digital 1's at both inputs thereof each NAND gate will be sequentially energized in correspondence with the output terminal of encoder 31 to which it is coupled. The diodes 34, 35 and 36 coupled to the outputs of NAND gates 15, 32 and 33 respectively serve to isolate the gates one from the other, as will be understood by those skilled in the art.

In order to multiply the output code bit capability of the system, additional circuit means may be formed to intersect with the outputs of encoder 14, one for each signal utilization stage. For example, circuit means are coupled to second NAND gate 32, and are thus available for coupling to ones of the output terminals of encoder 14. By connecting predetermined ones of the output terminals to NAND gate 32 by conductively coupling the appropriate junctions, another 10-bits of digital information is provided. Although corresponding bits are energized at the same time for all NAND gates, since only one NAND gate at a time is enabled only the coding peculiar to the matrix coupled thereto will be transmitted. In the illustrated embodiment, by using three NAND gates 15, 32 and 33 a total of 30 bits is made available for modulating the transmitted output. The first 10 bits are transmitted when second encoding means 31 energizes first NAND gate 15. The second 10 bits are transmitted when the next output terminal of encoder 31 is energized to enable NAND gate 32, and the third set of 10 bits is transmitted when third NAND gate 33 is energized.

It will not be appreciated that with the illustrated system a total of 10 signal utilization means, or NAND gates, allow a digital word of 100 bits to be transmitted. In order to achieve this capability with prior-art shift registers or artificial transmission lines, the original pulse producing means would have had to been duplicated nine times with a corresponding increase in complexity, power requirements and expense. However, by utilizing the described redundant matrix system, a 100 bit word length is achieved with the use of only two encoder means.

Further, by forming the matrix in the manner illustrated, it is possible to mass produce identical systems and then tailor them to produce a unique digital message by selectively connecting junctions within the matrix. This approach does not require specially tailored shift registers or encoders, and lends itself admirably to the inexpensive and efficient production of sophisticated transponders having high character capacities.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A passive transponder for producing a coded signal in response to the reception of an interrogating signal, comprising:

sensing means for developing a voltage in response to the reception of an interrogating signal;

pulse shaping means coupled to said sensing means for producing a train of pulses;

first encoder means coupled to said pulse shaping means and having a plurality of $n$ output terminals, said encoder means becoming operative in response to said train of pulses for consecutively energizing at a frequency $f$ each of said output terminals in synchronism with the pulses of said train of pulses;

second encoder means coupled to said first encoder means and having a plurality of output terminals, said second encoder means becoming operative in response to pulses produced by said first encoder means at a frequency of $f/n$ for consecutively energizing ones of said output terminals in synchronism with the pulses received from said first encoder means;

a plurality of signal utilization means;

circuit means for coupling ones of said output terminals of said second encoder means to ones of said signal utilization means for sequentially enabling said signal utilization means;

second circuit means coupling predetermined ones of said output terminals of said first encoder means to ones of said signal utilization means; and transmitter means coupled to said signal utilization means for outputting radio-frequency signals modulated to reflect the operation of said signal utilization means.

2. The invention defined in claim 1, wherein said first and said second encoder means comprise monolithic integrated circuits.

3. The invention defined in claim 2, wherein said second circuit means comprise a plurality of diodes and conductive leads associated therewith, each of said leads traversing a plurality of said output terminals of said first encoder means to form a matrix, predetermined ones of the intersections of said circuit means and said output terminals being conductively connected.

4. The invention defined in claim 3, wherein said signal utilization means comprise a plurality of NAND gates.

5. A passive transponder for producing a first, high-frequency signal for identifying the transponder in response to the reception thereby of a second, lower frequency signal, comprising:

antenna means for receiving the lower-frequency signal and sustaining a voltage thereacross in the presence of such signal;

rectifier means coupled to said antenna for developing a DC voltage;

pulse shaping means coupled to said antenna and responsive to the fluctuation of the voltage arising thereacross for producing a continuous train of pulses at a frequency $f$ in response to the presence of the interrogating signal;

first encoder means coupled to said pulse shaping means and having a plurality of $n$ output terminals, each of said output terminals sequentially producing an output pulse upon the application of said train of pulses to said first encoder means;

a plurality of signal utilization means;

a first set of conductors extending from each of the output terminals of said first encoder means;

a second set of conductors overlapping said first set of conductors to form a plurality of intersections, predetermined ones of said intersections constituting electrical connections between an output terminal conductor and a second conductor;

unidirectional conducting means coupling ones of said conductive intersection to input terminals of said signal utilization means;

second encoder means having an input terminal coupled to said first encoder means for reception of pulses produced by said first encoder means at a frequency of $f/n$ for consecutively energizing ones of said output terminals in synchronism with the pulses received from said first encoder means;

circuit means coupling ones of said output terminals of said second encoder means to ones of said signal utilization means for sequentially energizing said signal utilization means in the presence of a pulse received from said first encoder means; and transmitter means coupled to said signal utilization means for outputting radio-frequency signals modulated in response to pulses received from said signal utilization means.

6. The invention defined in claim 5, further including voltage regulation means coupled to said rectifying means for providing a supply voltage of a predetermined value.

7. The invention defined in claim 6, wherein said pulse shaping means comprises bistable means for producing discrete pulses of a predetermined amplitude.

8. The invention defined in claim 7, wherein said first and said second encoder means comprise monolithic integrated circuits.

9. The invention defined in claim 8, wherein said signal utilization means comprise NAND gates.

10. The invention defined in claim 9, wherein signals supplied said transmitter by said signal utilization means serve to modulate the frequency of the radio-frequency signal outputted by said transistor means.

11. The invention defined in claim 10, wherein said first, lower frequency signal occurs at substantially 10KHz, and said higher-frequency signal occurs at substantially 420KHz.

* * * * *